(12) United States Patent
Haehnel

(10) Patent No.: US 6,915,568 B2
(45) Date of Patent: Jul. 12, 2005

(54) METHOD OF MANUFACTURING CONNECTING RODS

(75) Inventor: Michael Haehnel, Rochester Hill, MI (US)

(73) Assignee: Metaldyne Company LLC, Plymouth, MI (US)

(*) Notice: Subject to any disclaimer, the term of this patent is extended or adjusted under 35 U.S.C. 154(b) by 0 days.

(21) Appl. No.: 10/744,275

(22) Filed: Dec. 23, 2003

(65) Prior Publication Data

US 2004/0177502 A1 Sep. 16, 2004

Related U.S. Application Data

(60) Provisional application No. 60/436,105, filed on Dec. 23, 2002.

(51) Int. Cl.[7] ............................................. B21D 53/84
(52) U.S. Cl. ...................... 29/888.09; 29/564; 29/56.5; 225/100
(58) Field of Search ................ 29/888.09, 563, 29/564, 564.7, 56.5, 38.9, 33 P; 225/98, 100

(56) References Cited

U.S. PATENT DOCUMENTS

| | | |
|---|---|---|
| 2,553,935 A | 5/1951 | Parks et al. |
| 2,703,263 A | 3/1955 | Zernov |
| 4,198,879 A | 4/1980 | Hornak et al. |
| 4,569,109 A | 2/1986 | Fetouh |
| 4,860,419 A | 8/1989 | Hekman |
| 4,993,134 A * | 2/1991 | Hoag et al. ............ 29/888.092 |
| 5,568,891 A * | 10/1996 | Hoag et al. .................... 225/93 |
| 5,878,491 A | 3/1999 | Morgen et al. |
| 5,918,575 A | 7/1999 | Ishii |
| 5,946,790 A | 9/1999 | Graham et al. |
| 5,974,663 A | 11/1999 | Ikeda et al. |
| 6,506,143 B1 * | 1/2003 | Goto et al. .............. 29/888.09 |
| 6,536,642 B1 * | 3/2003 | Cavallo et al. .......... 29/888.09 |
| 6,782,609 B1 * | 8/2004 | Beggs ..................... 29/888.09 |

* cited by examiner

Primary Examiner—David P. Bryant
(74) Attorney, Agent, or Firm—Robert C. Baraona; McDonald Hopkins Co., LPA

(57) ABSTRACT

A streamlined method for the mass production of connecting rods is disclosed, with particular applicability for anticipated in the production of rods made from powdered metal materials. The method contemplates the rough grinding of a work piece, followed by the use of a single, flexibly tooled boring machine to create crank and pin bores. The work piece is then fracture split, subjected to a final grinding process and honed to specific tolerances without the need for final boring. The entire inventive process may be implemented on a five work station assembly line, thereby reducing the capital investment in machinery and space required by previously known methods.

2 Claims, 3 Drawing Sheets

METHOD OF MANUFACTURING CONNECTING RODS

RELATED APPLICATION

This application claims priority to a provisional Ser. No. 60/436,105, filed Dec. 23, 2002.

FIELD OF INVENTION

This invention relates to the manufacture of engine parts, and more particularly to the method of manufacturing connecting rods.

BACKGROUND

Connecting rods are needed for all sizes and types of engines. A typical engine connecting rod 10, shown in FIG. 1, has an apertured large end encompassing a crank bore 20 adapted for installation about a crankshaft journal. The smaller apertured end encompassing a pin bore 24 is connected to the piston assembly to transfer power from the engine to the drive train. The shank 26 connects the two ends.

In the past, connecting rods were manufactured from solid steel blanks. Grinding and boring operations fashioned the blank to the desired specifications. More recently, powder metal has been used to more accurately and efficiently create preformed connecting rod blanks that are then subjected to standard grinding and boring operations. A brief explanation of the prior art manufacturing operation is as follows with reference to FIG. 1:

In the prior art connecting rod manufacturing process, a preformed metal connecting rod blank is obtained (see generally FIG. 1), although, today many of the preformed metal connecting rod blanks are made of powder metal. Regardless, the connecting rod blank is already manufactured to general connecting rod specifications, including having preformed features such as crank, pin holes, and bolt holes. The connecting rod blank is then machined to the required specifications.

In the prior art, the connecting rod blank is placed in a station-to-station manufacturing line to machine the part to the required specifications. First, in Station #1, the thickness of the component is rough-ground. Then the part is transferred to Station #2 where a rough bore process more accurately defines the bore requirements and where fracture notches 32 are formed on the large aperture end portion. While each operation is typically performed on numerous, dedicated and separate machines, this step is generally designated as Station #2.

The part is then transferred to Station #3 where the cap 22 is fracture split along the fracture notches 32 to crack the rod into two parts across the large aperture end portion. The connecting rod may then be assembled to ensure proper mating. A final finish grind is performed at Station #4 to ensure appropriate thickness of the connecting rod. A final finish bore is then performed at Station #5 to ensure appropriate bore sizes. Finally, the entire component is honed with abrasive tools to ensure appropriate smoothness and mating surface requirements at Station #6. Significantly, the machines required at each of the aforementioned Stations are well-known to those skilled in the art.

The connecting rod manufacturing art is constantly looking for ways to make the manufacture of connecting rods faster, cheaper, and easier. Because large numbers of parts are manufactured each year according to the above-identified manufacturing process, any efficiency in manufacture can result in substantial cost and time savings. For example, U.S. Pat. No. 5,946,790 (incorporated by reference herein) teaches a process for mass producing connecting rods by way of a station-to-station assembly line production method and apparatus.

While connecting rods have been manufactured for decades, relatively recent improvements in engine designs require such connecting rods to be manufactured to highly specific tolerances and dimensions. These highly specific dimensions and tolerances render many of the previously known methods of manufacturing connecting rods either inefficient or obsolete.

The use of fracture splitting in connecting rods has also been known in the art for many years. However, as discussed in U.S. Pat. No. 4,198,879 (incorporated by reference herein), failure rates for fracture splitting techniques have approached 40% in some previously known methods. Moreover, many of the previously known methods did not provide for a means of consistently and efficiently mass producing connecting rods having the necessary tolerances and dimensions, such that additional boring, grinding and honing (as mentioned above) was often needed, thereby resulting in added costs in terms of machinery and spatial requirements along the manufacturing line itself.

SUMMARY OF INVENTION

In view of the above, a primary object of the present invention is to increase the efficiency of the manufacturing process and provide cost and time savings in the connecting rod manufacturing process through a reduction in the number and type of machines required to mass produce connecting rods, specifically through the use of a five work station process.

Another object of the present invention to reduce the capital investment required to tool such manufacturing lines through the use of machinery capable of interchangeable tooling.

Yet another object of the present invention is to increase the spatial efficiency of the manufacturing process so that the floor space required for such manufacturing lines can be reduced, thereby reducing overhead.

Still another object of the invention is to provide for a method of mass producing connecting rods, preferably made of powdered metal materials, within very specific tolerances, typically within less than ±0.1 mm of a desired target.

Although the present invention will be more fully described in the following written description with reference to the accompanying drawings, a brief summary of the invention is as follows: a work piece is provided and the thickness (i.e., thrust faces) of that work piece are rough ground and then crank and pin bores are created using a single, flexibly tooled machine. The work piece is then fracture split to create the cap along the crank bore which is characteristic of connecting rods. The work piece is then finish ground and honed without the need for additional boring of either the crank or pin bores. Ideally, the work piece is formed from a powdered metal material, and the aforementioned single flexibly tooled machine need not require or implement the use of laser technology.

BRIEF DESCRIPTION OF DRAWINGS

Objects and advantages together with the operation of the invention may be better understood by reference to the following detailed description taken in connection with the following illustrations, wherein.

DESCRIPTION OF PREFERRED EMBODIMENTS

The present invention provides a process and method for manufacturing connecting rods that reduces the steps performed in the prior art so as to increase efficiency and reduce capital and overhead investments. Particularly, the present invention provides for all necessary boring and drilling operations to be performed prior to fracture splitting. Another aspect of the present invention is to perform numerous manufacturing operations on a single, flexible machine having automatic tool change capabilities and fixtures that allow spindles to machine the connecting rod from different sides of the component thereby reducing floor space required and reducing the capital investment required in purchasing separate manufacturing machines. Finally, the invention may be incorporated into existing plant equipment, without the need for investment in new fracture splitting equipment or machinery (particularly, machinery relying upon lasers or other highly specialized technological innovations).

Figure 1:
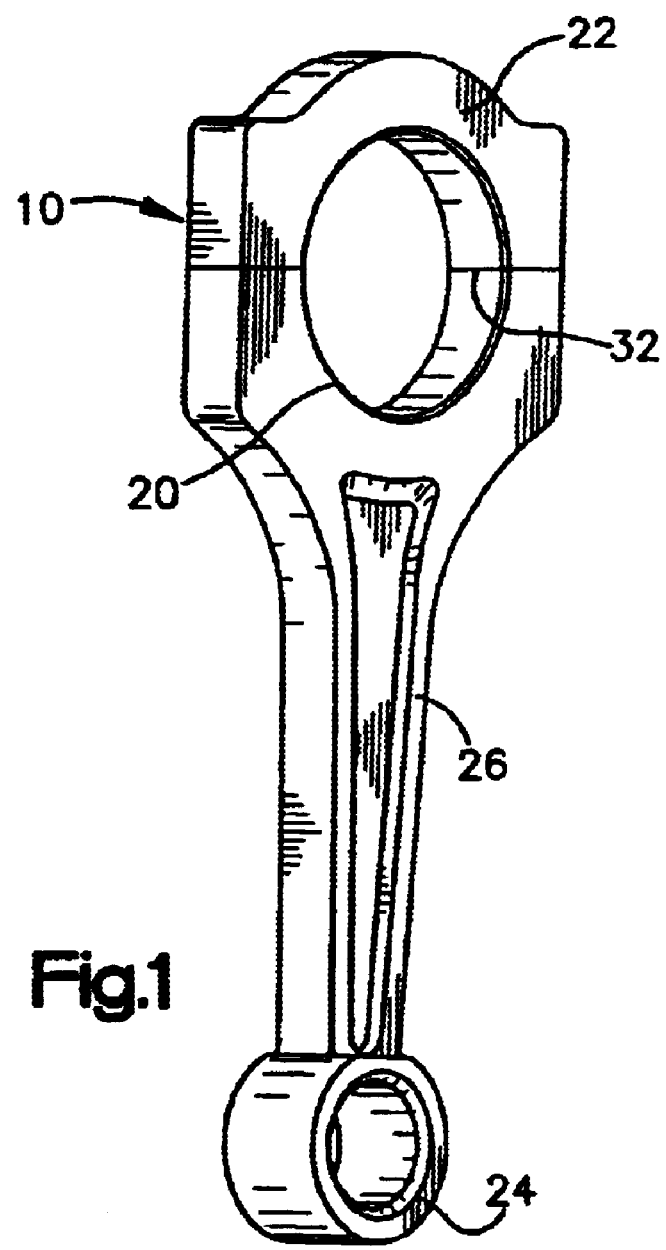
FIG. 1 is a typical connecting rod blank.
Figure 2:
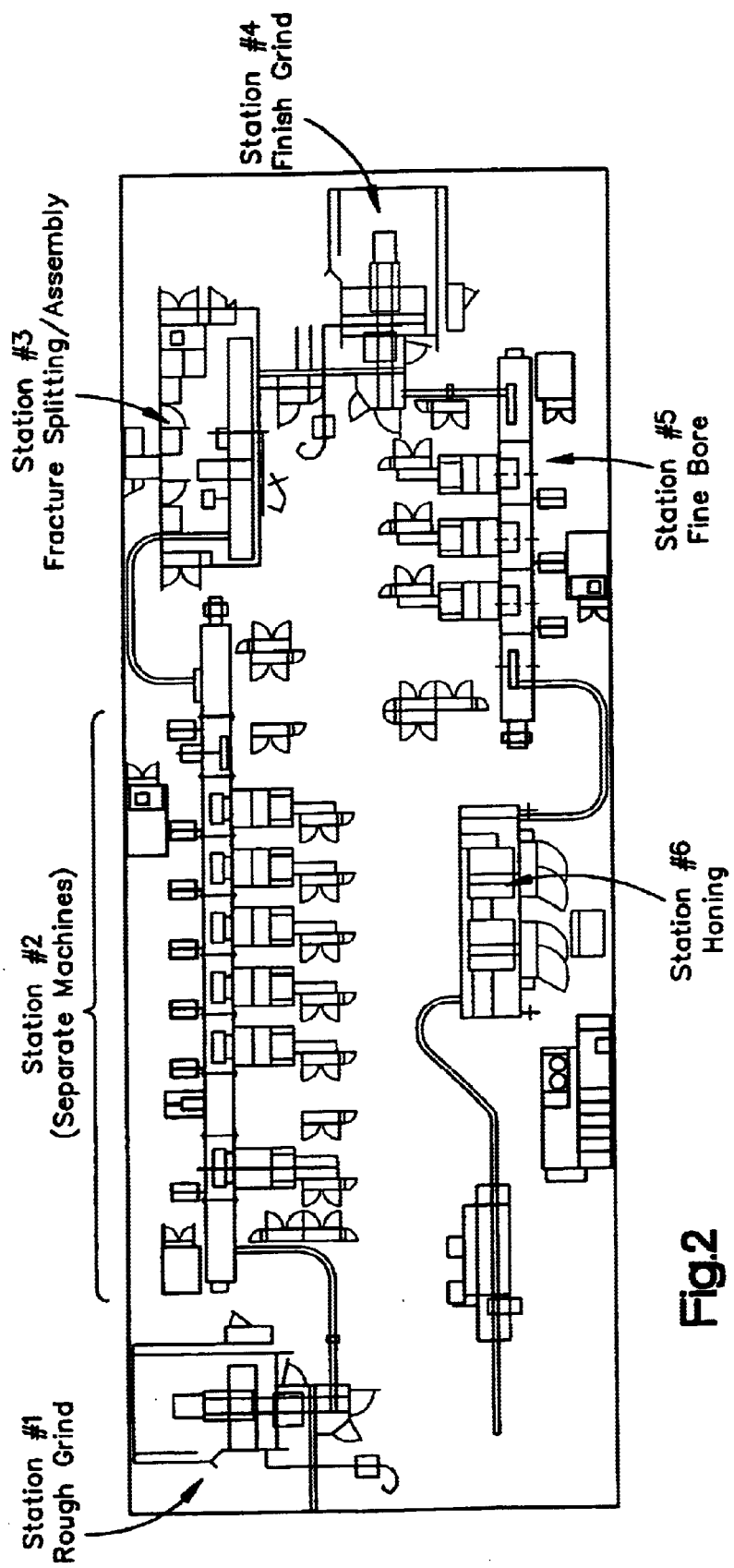
FIG. 2 is schematic of the prior art manufacturing process.

In comparison to the prior art mass production process illustrated in FIG. 2, the present invention simplifies the prior art manufacturing process by eliminating the finish bore step of Station #5 and performing all necessary boring and drilling operations at Station #2 prior to fracture splitting. Thus, Station #5 is eliminated, and all capital investments associated with the equipment, maintenance, manpower, and floor space required by that Station are likewise eliminated. To make the process even more efficient, the boring and drilling operations can be performed on an automated machine known in the industry which possesses automatic tool change capabilities so as to take up less manufacturing space, again minimizing the capital investments in equipment, maintenance, man-power, and floor space requirements. Because this single machine must perform multiple tasks, the cannot require the use of dedicated laser processes or related, single-use technologies.

Notably, the final finish bore operation of Station #5 is needed in the prior art due to the fact that fracture splitting of the connecting rod at Station #3 causes deformation of the component within the previously machined bores. Thus, Station #5 was needed to remove a relatively small amount of material to ensure proper bore formation subsequent to the fracture splitting operation. The component was then transferred to Station #6 for honing.

In contrast, the present invention reduces manufacturing time while eliminating the costs associated with the final bore step by transferring the component from finish grind directly to honing machine. By making relatively complete and accurate initial bores, the need for removing any amount of material therefrom is reduced. Moreover, these bores can be made using a single, flexibly tooled boring machine, rather than a series of separate, dedicated boring machines as known in the prior art. Using this approach, numerous fracturing splitting operations can be implemented with minimal deformation, thereby eliminating the need for final boring.

This invention acknowledges the possible need for slight correction of bore size due to slight deformation in the component bores; thus, it is expected that the honing process of the present invention may be relied upon a greater degree. Specifically, honing process of the prior art may remove 0.1 mm of material, whereas the present invention anticipates honing could be as much as 0.3 mm of material. Nevertheless, the cost savings associated with the elimination of multiple, dedicated boring machines in the initial boring process, coupled with the complete elimination of the final boring process after fracture splitting will result in substantial savings in terms of equipment and usage of space.

Therefore, the present invention is characterized by the following process. A preformed metal connecting rod blank, which may also be made of powder metal, is manufactured to general connecting rod specifications, such specifications including specific thickness as measured along the thrust faces and other preformed features such as a crank bore 20 at one end, a pin bore 24 at another end, a shank 26 disposed between these two bores, a cap 22 formed integrally at the terminal end of the crank bore end and optional bolt holes (not shown) formed within the crank bore end. The connecting rod blank will then be mass produced according to these required features/specifications.

Figure 3:
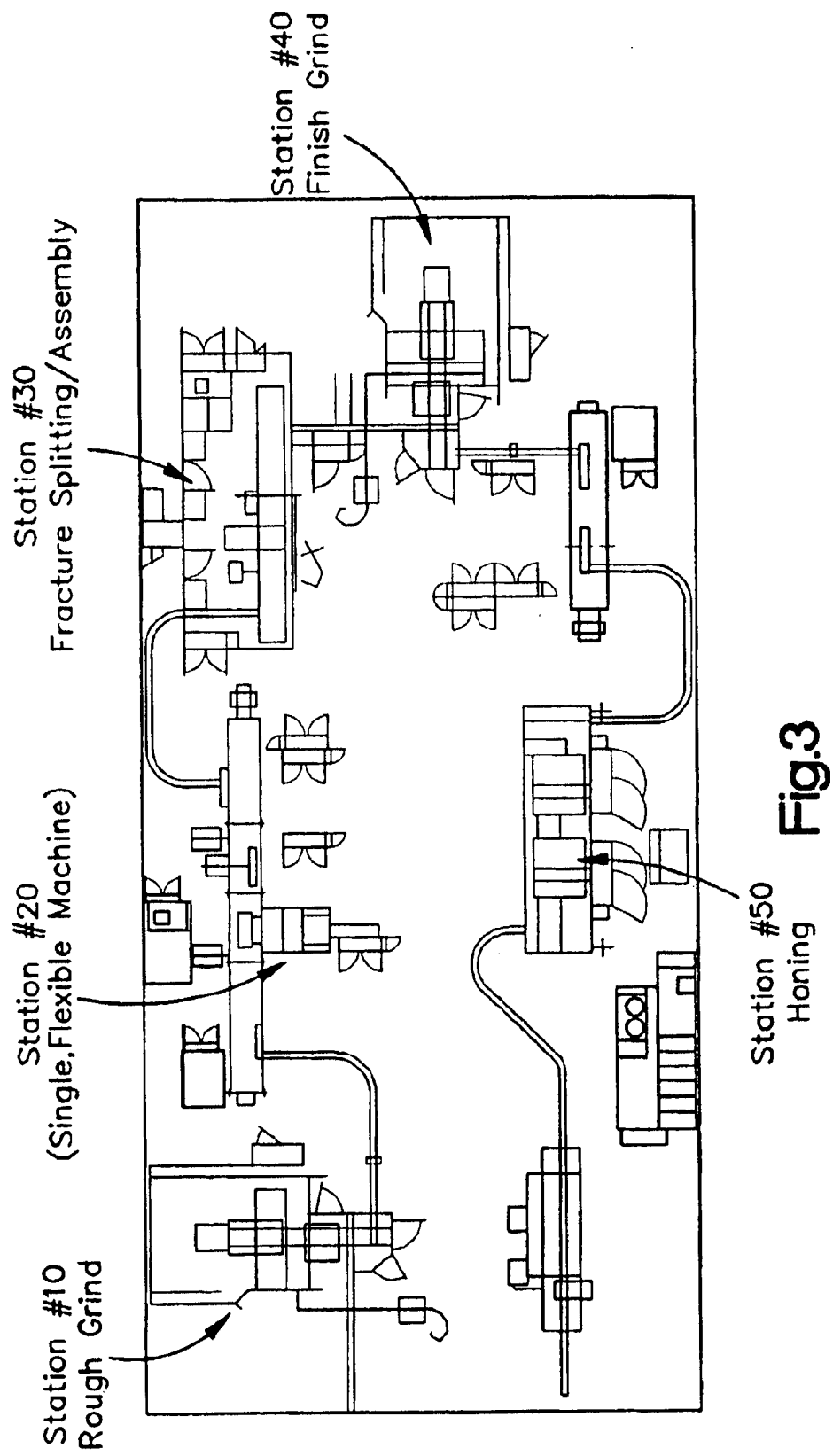
FIG. 3 is schematic of the present invention.

With reference to FIG. 3, the connecting rod blank is transferred to Station #10, where the thickness of the component is rough-ground. Then the part is transferred to Station #20 where a rough bore process more accurately defines the bore requirements and where fracture notches 32 are formed. Notably, because Station #20 encompasses a single machine to create both the bores 20, 24 and the fracture notches 32, this machine must necessarily possess the flexibility in terms of tooling and operation to permit a wide array of processes (preferably automated). Specifically, the present invention utilizes a machine having interchangeable tooling to perform each of the required manufacturing steps associated with Station #20 at a single machine. This machine will be capable of accepting and utilizing the various different tooling types needed to perform all the boring operations and, consequently, requires use of traditional boring-bar-type technology instead of laser cutting techniques because the latter fail to possess the flexibility necessary to create varying crank bores, pin bores and fracture notches. Further, the boring process must be accurate enough to remove the required amount of material from the bore in a single boring process. Such efficiency not only decreases the floor space required, but requires the purchase and maintenance of only one machines as opposed to numerous machines.

The part is then transferred to Station #30 where the cap 22 is fracture split along the fracture notches 32 to crack the rod into two parts across the large aperture end portion. The connecting rod may then be assembled to ensure proper mating. A final finish grind is performed at Station #40 to ensure appropriate thickness of the connecting rod. Finally, the entire component is honed with abrasive tools to ensure appropriate smoothness and mating surface requirements at Station #50. If required, the honing tools can remove enough material so that the part meets the manufacturing specifications. As noted on FIG. 3, the prior art requirements of multiple initial boring machines and post-fracture splitting boring machines have both been eliminated.

The invention has been described with reference to the preferred embodiment. Obviously, modifications and alternations will occur to others upon a reading and understanding of this specification. The claims as follows are intended to include all modifications and alterations insofar as they come within the scope of the claim or the equivalent thereof.

I claim:

1. In a method of mass production of connecting rods utilizing five discrete work stations, said connecting rods having a crank bore at a first end, a pin bore at a second end, a shank portion disposed between the first and second ends and a cap along the first end, the method comprising:

provide a work piece;

rough grinding thrust faces on said work piece at a first work station;

boring a crank bore in a first end of said work piece including fracture notches and boring a pin bore in a second end of said work piece at a second work station, said second work station having a single machine with flexible tooling capable of performing all boring operations;

fracture splitting said work piece to create a cap along the first end of said work piece at a third work station;

finish grinding said thrust faces at a fourth work station; and honing said crank bore and said pin bore at a fifth and final work station, wherein said honing occurs without additional boring subsequent to said fracture splitting.

2. The method according to claim 1, wherein the work piece is formed from a powdered metal material.

* * * * *